(12) United States Patent
Benedict et al.

(10) Patent No.: US 12,197,446 B2
(45) Date of Patent: *Jan. 14, 2025

(54) MANAGING OVERLAPPING DATA REQUESTS

(71) Applicant: Capital One Services, LLC, McLean, VA (US)

(72) Inventors: Kyle Benedict, North Chesterfield, VA (US); Sally Schmidt, Powhatan, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/407,913

(22) Filed: Jan. 9, 2024

(65) Prior Publication Data

US 2024/0220504 A1 Jul. 4, 2024

Related U.S. Application Data

(63) Continuation of application No. 17/962,022, filed on Oct. 7, 2022, now Pat. No. 11,907,225.

(51) Int. Cl.
*G06F 16/00* (2019.01)
*G06F 16/215* (2019.01)
*G06F 16/2455* (2019.01)

(52) U.S. Cl.
CPC ...... *G06F 16/24556* (2019.01); *G06F 16/215* (2019.01)

(58) Field of Classification Search
CPC .................................................. G06F 16/215
See application file for complete search history.

(56) References Cited

U.S. PATENT DOCUMENTS

| | | |
|---|---|---|
| 8,620,793 B2 | 12/2013 | Knyphausen et al. |
| 9,591,061 B2 | 3/2017 | Gupta et al. |
| 9,753,686 B2 | 9/2017 | Fan et al. |
| 10,191,705 B2 | 1/2019 | Valeriano et al. |
| 10,261,994 B2 | 4/2019 | Marcu et al. |
| 10,860,554 B2 | 12/2020 | Ramaswamy et al. |
| 2002/0111787 A1 | 8/2002 | Knyphausen et al. |
| 2002/0120762 A1 | 8/2002 | Cheng et al. |
| 2003/0172020 A1 | 9/2003 | Davies et al. |
| 2013/0232149 A1 | 9/2013 | Smith et al. |
| 2013/0275429 A1 | 10/2013 | York et al. |

(Continued)

FOREIGN PATENT DOCUMENTS

| | | |
|---|---|---|
| GB | 2570600 A | 7/2019 |
| WO | 2015164521 A1 | 10/2015 |

(Continued)

*Primary Examiner* — Ajith Jacob
(74) *Attorney, Agent, or Firm* — Banner & Witcoff, Ltd.

(57) ABSTRACT

A method, apparatus, and computer-readable medium are described that reduce overlapping portions of data object instances. The data object instances may include requests for identifying locations of stored documents. By comparing a second data object instance to one or more first data object instances, one or more overlapping portions may be removed from the second data object instance. Once the second data object instance is returned with locations of newly identified locations of documents, the removed portions of the second data object instance may be added back with previously identified locations of the documents.

20 Claims, 14 Drawing Sheets

(56) References Cited

U.S. PATENT DOCUMENTS

| | | |
|---|---|---|
| 2015/0135300 A1 | 5/2015 | Ford |
| 2016/0048936 A1 | 2/2016 | Perkowsi et al. |
| 2019/0073730 A1 | 3/2019 | Perkowski et al. |
| 2020/0242710 A1 | 7/2020 | Krovvidi |
| 2021/0232992 A1 | 7/2021 | Disterheft et al. |
| 2021/0295046 A1 | 9/2021 | Gupta |

FOREIGN PATENT DOCUMENTS

| | | |
|---|---|---|
| WO | 2019036265 A1 | 2/2019 |
| WO | 2021030817 A1 | 2/2021 |

MANAGING OVERLAPPING DATA REQUESTS

CROSS-REFERENCE TO RELATED APPLICATIONS

This application is a continuation of and claims priority to U.S. patent application Ser. No. 17/962,022, filed Oct. 7, 2022, the disclosure of which is hereby incorporated by reference in its entirety for all purposes.

TECHNOLOGICAL FIELD

Aspects of the disclosure relate generally to reducing overlap between data structures relating to similar datasets.

BACKGROUND

In addition to their daily tasks, workers are occasionally asked to provide documents or links to documents in their possession. Computing systems store the produced documents while also indexing the documents. Over time, the computing systems may be tasked to store multiple copies of the same documents as the documents were generated in response to separate, but overlapping, requests. For a large corporation, the overlap between multiple requests over the course of years may be substantial, resulting in significant expenditures to maintain duplicate images and/or indexes to each of the separate duplicate documents.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the disclosure relate to identifying, between requests for documents, whether the same documents are being requested. The documents may be identified by document types, creators of the documents, and dates and/or time spans during which the documents were created and/or edited. For example, a method, apparatus, and computer-readable medium are described that reduce overlapping portions of data object instances. The data object instances may include requests for identifying locations of stored documents. By comparing a second data object instance to one or more first data object instances, one or more overlapping portions may be removed from the second data object instance. Once the second data object instance is returned with locations of newly identified locations of documents, the removed portions of the second data object instance may be added back with previously identified locations of the documents.

The term "document" may be used to describe content that may appear in various forms including specific files and/or threads of content that do not have a specific file associated with them. As such, the term "document" is intended to refer generally to a collection of data that may include, for instance, a file with text editable in document processing software (e.g., MICROSOFT® Word from the Microsoft Corporation of Washington), an email or email thread viewable in an email client, a spreadsheet file storing data in tabular form, team communications between two or more individuals on a computing platform (e.g., on the SLACK® from Slack Technologies, Inc. of California), and the like. The term "custodian" is used herein to describe an individual who has access to the requested documents and/or locations of the documents.

Some implementations described herein relate to a computer-implemented method for receiving, from a first device and by a second device, a first request for information stored in heterogeneous data stores. The first request may include a first owner identification, a first time span, and one or more first repository types. The method may also include generating, based on the first request for information, a first instance of a data object comprising a device identification field identifying a third device associated with the first owner identification, a time span field including a first time span of a plurality of time spans, and first document type fields associated with one or more first repository types; sending the first instance of the data object to the third device; receiving, from the third device, a completed first instance of the data object comprising a first data structure comprising a first address to a first document of a first document type in a first repository and a second address to a second document of a second document type in a second repository; and sending, in response to the first request, the completed first instance of the data object. The method may further include receiving, from the first device and by the second device, a second request for information stored in the heterogeneous data stores, wherein the second request may include the first owner identification, a second time span, and one or more second repository types, and generating, based on the second request for information, a second instance of the data object comprising the device identification field identifying the third device, the time span field including the second time span, and second document type fields associated with the one or more second repository types. The method may include comparing the first instance of the data object and the second instance of the data object; sending, to the third device and based on the comparison, a modified second instance of the data object with one or more of a modified second time span or modified second document type fields associated with the one or more second repository types; receiving, from the third device, a completed modified second instance of the data object comprising a second data structure including a third address to a third document of a third document type in a third repository, and a fourth address to a fourth document of a fourth document type in a fourth repository; and sending, in response to the second request, the completed modified second instance of the data object and, based on the comparison, a portion of the completed first instance of the data object. The portion of the completed first instance of the data object may satisfy at least a portion of the second request. In some aspects, the first document type may correspond to the third document type.

In some aspects, the computer-implemented method may further include storing, in a workspace, the completed first instance of the data object associated with each of the second device, the third device, the first time span, the first document type, and the second document type; determining whether the second device is authorized to modify the first instance of the data object; modifying, based on a determination that the second device is authorized to modify the first instance of the data object, the first instance of the data object; sending, to the third device, the modified second instance of the data object; receiving, from the third device, an updated second instance of the data object; and sending, in response to the second request, the updated second instance of the data object. In some aspects, first owner identification may include a single account. In some aspects, first owner identification may include a collection of accounts.

In some aspects, the computer-implemented method may further include determining a time span intersection between the first time span and the second time span; determining a document type intersection between the one or more first repository types and the one or more second repository types; and modifying, based on the time span intersection and the document type intersection, the second instance of the data object to exclude the document type intersection from the second instance of the data object for the time span intersection.

In some aspects, the computer-implemented method may further include generating a third instance of the data object including repository types different from the document type intersection, wherein the third instance includes, in the time span field, the time span intersection; and generating a fourth instance of the data object including the repository types in the second document type fields associated with the one or more second repository types and for a portion of the second time span not included in the time span intersection.

Additional aspects, configurations, embodiments and examples are described in more detail below.

BRIEF DESCRIPTION OF THE SEVERAL VIEWS OF THE DRAWINGS

The present disclosure is illustrated by way of example and not limited in the accompanying figures in which like reference numerals indicate similar elements and in which.

Figure 1:
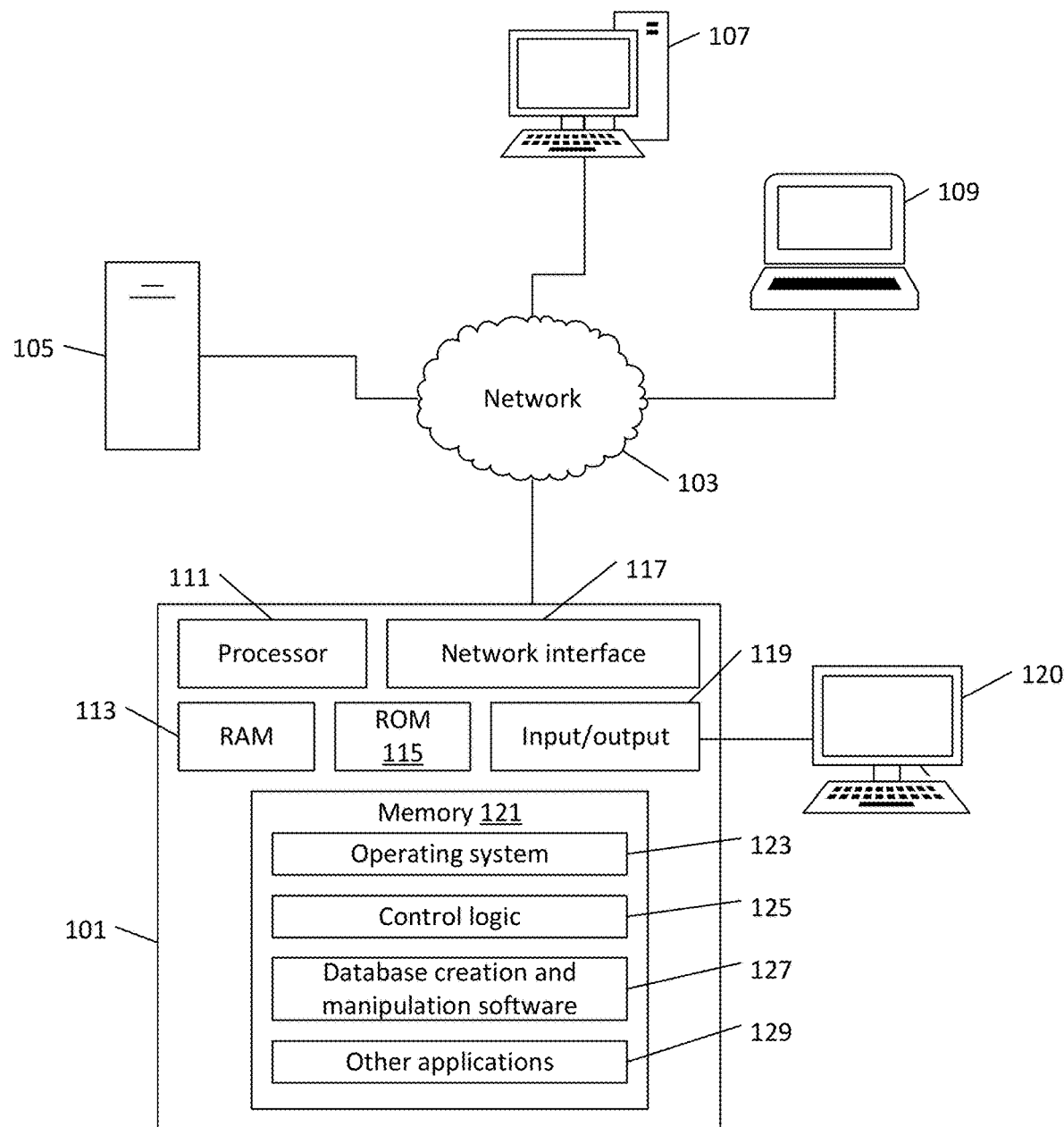
FIG. 1 depicts an example of a computing device and system architecture that may be used in implementing one or more aspects of the disclosure in accordance with one or more illustrative aspects discussed herein.

It will be recognized by the skilled person in the art, given the benefit of this disclosure, that the exact arrangement, sizes and positioning of the components in the figures is not necessarily to scale or required.

DETAILED DESCRIPTION

Certain aspects relate to reducing overlapping portions of data object instances. The data object instances may include data structures that are associated with the locations of content where the content is associated with one or more individuals. The data object instances may include requests for identifying locations of stored documents. By comparing a second data object instance to one or more first data object instances, one or more overlapping portions may be removed from the second data object instance. Once the second data object instance is returned with locations of newly identified locations of documents, the removed portions of the second data object instance may be added back with previously identified locations of the documents.

One or more aspects may generally relate to improving how information is obtained and subsequently stored in databases. In various situations, individuals at companies may be required to identify and provide copies of documents in response to requests from others. For example, a software developer may be requested to provide documents and/or locations of documents in response to requests from supervisors and/or other entities providing services on behalf of the company. Depending on the length of time the software developer has been employed by the company, the software developer may have a significant quantity of documents that are relevant to the requests. In an example where multiple supervisors and/or other entities provide multiple requests to the software developer, various portions of those requests may overlap in the scope of documents requested from that software developer. Conventional approaches expect responses to each request for documents and, thereby, store the content from the requests, regardless of the overlapping nature of the underlying requests and/or generated content. While one may attempt to de-duplicate the resulting content, the de-duplication is often unsatisfactory as it requires the software developer to repeatedly identify documents and/or their locations despite having previously done so. As described herein, one or more aspects relate to creating instances of data objects for the various requests for documents, removing overlapping portions of the instances, sending the instances to the individual with the documents, receiving the completed instances, and modifying the received instances to include the previously removed overlapping portions and previously provided documents corresponding to those overlapping portions.

For example, one or more aspects of the concepts described herein relate to improving how documents are handled in organizations and/or across organizations. For example, upon commencement of a litigation, a general litigation hold order is imposed that prevents destruction of documents relevant to that litigation. The larger an organization becomes, the more likely it may be engaged with multiple litigations at any given time. Managing overlapping litigation holds can be cumbersome, if not costly, to the organization. A benefit of one or more of the disclosed aspects is that the process, by obtaining documents from custodian and separately managing access to those documents, removes the burden of complying with the litigation hold from each individual user and instead centrally manages it. The litigation hold may be managed centrally by the organization by determining and which individuals may be relevant to a litigation hold and ensure that their documents are maintained for a relevant time period. Also, the burden of producing documents for individuals who are subject to overlapping document requests. For instance, a given user (also referred to as a custodian of the documents) may need to produce documents in response to a first document production request relating to, for a first litigation, a first set of document types and during a first window of time. That user may subsequently need to product documents in response to a second document production request relating to, for a second litigation, a second set of documents types and during a second window of time. To the extent that the first set of document types and the second set of document types overlap and the first time window and the second time window overlap, the user is relieved from producing the overlapping documents for the second litigation as the disclosed system and/or process determines the overlap, identifies the overlapping documents, and modifies the second document request to remove the overlapping document types for the overlapping time window. When the set of documents for the second request are to be produced, the previously obtained overlapping documents are added to the new documents provided in response to the second document request and forwarded as completing the second document request. The collection of the documents related to the second document request may be stored separately from the actual repository from where they originated and/or may represent links to the repository with filters for those documents. The litigation hold may be implemented via one or more of maintaining a copy of those relevant documents separately and/or maintaining links to those documents while maintaining a flag (or other identifier) on the repositories to prevent deletion of documents from those repositories (and/or the repositories themselves) when so identified.

In further aspects, the disclosed techniques improve the handling of chain of custody-related issues where a documentation needs to be maintained of how the documents were obtained, who obtained them, when they obtained them, how they obtained them (e.g., what criteria was used to filter the repositories to find the documents), and what happened with the documents over time (e.g., where were they maintained between initial creation in the repository and production). Various aspects include maintaining the chain of custody-related information in addition to the links to the collected documents. The chain of custody-related information may be provided with the links to the documents or with the produced documents, as desired. By providing the chain of custody-related information with the information responsive to the document production request, the need for separately requesting the chain of custody information may be reduced and/or eliminated. Further, the chain-of-custody information may follow the documents/ links to the documents regardless of the actual production request that generated the document collection. For example, where a set of all emails of an individual, sent and received during a time frame, have been identified (e.g., copies made and separately maintained and/or links to the locations of the documents obtained), the content of those documents should not change over time. Because the content of those documents are fixed, the documents may be associated with the chain of custody information and handled as a fixed set of documents meeting specific criteria that caused them to be originally collected, regardless of the details of nature of the original document request or litigation that prompted the original collection of the documents.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. Any sequence of computer-implementable instructions described in this disclosure may be considered to be an "algorithm" as those instructions are intended to solve one or more classes of problems or to perform one or more computations. While various directional arrows are shown in the figures of this disclosure, the directional arrows are not intended to be limiting to the extent that bi-directional communications are excluded. Rather, the directional arrows are to show a general flow of steps and not the unidirectional movement of information. In the entire specification, when an element is referred to as "comprising" or "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software. Throughout the specification, expression "at least one of a, b, and c" may include 'a only', 'b only', 'c only', 'a and b', 'a and c', 'b and c', and/or 'all of a, b, and c'.

Before discussing the concepts of the disclosure in greater detail, however, several examples of a computing device that may be used in implementing and/or otherwise providing various aspects of the disclosure will first be discussed with respect to FIG. 1. FIG. 1 illustrates one example of a computing device 101 that may be used to implement one or more illustrative aspects discussed herein. For example, the computing device 101 may, in some embodiments, implement one or more aspects of the disclosure by reading and/or executing instructions and performing one or more actions based on the instructions. In some embodiments, the computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

The computing device 101 may, in some embodiments, operate in a standalone environment. In others, the computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109, and other devices (not shown) may be connected to one or more of the networks via twisted pair wires, coaxial cable, fiber optics, radio waves, or other communication media. Additionally or alternatively, the computing device 101 and/or the network nodes 105, 107, and 109 may be a server hosting one or more databases.

As seen in FIG. 1, the computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with database operations. Input/output 119 may include a variety of interface units and drives for reading, writing, displaying, and/or printing data or files. Input/output 119 may be coupled with a display such as display 120. Memory 121 may store software for configuring computing device 101 into a special purpose computing device in order to perform one or more of the various functions discussed herein. Memory 121 may store operating system software 123 for controlling overall operation of the computing device 101, control logic 125 for instructing the computing device 101 to perform aspects discussed herein, database creation and manipulation software 127 and other applications 129. Control logic 125 may be incorporated in and may be a part of database creation and manipulation software 127. In other embodiments, the computing device 101 may include two or more of any and/or all of these components (e.g., two or more processors, two or more memories, etc.) and/or other components and/or subsystems not illustrated here.

Devices 105, 107, 109 may have similar or different architecture as described with respect to the computing device 101. Those of skill in the art will appreciate that the functionality of the computing device 101 (or device 105, 107, 109) as described herein may be spread across multiple data processing devices, for example, to distribute processing load across multiple computers, to segregate transactions based on geographic location, user access level, quality of service (QOS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Python, JavaScript, or an equivalent thereof. The computer executable instructions may be stored on a computer readable medium such as a hard disk, optical disk, removable storage media, solid-state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product. Having discussed several examples of computing devices which may be used to implement some aspects as discussed further below, discussion will now turn to a method for classifying textual data using a machine-learning classifier.

Figure 2:
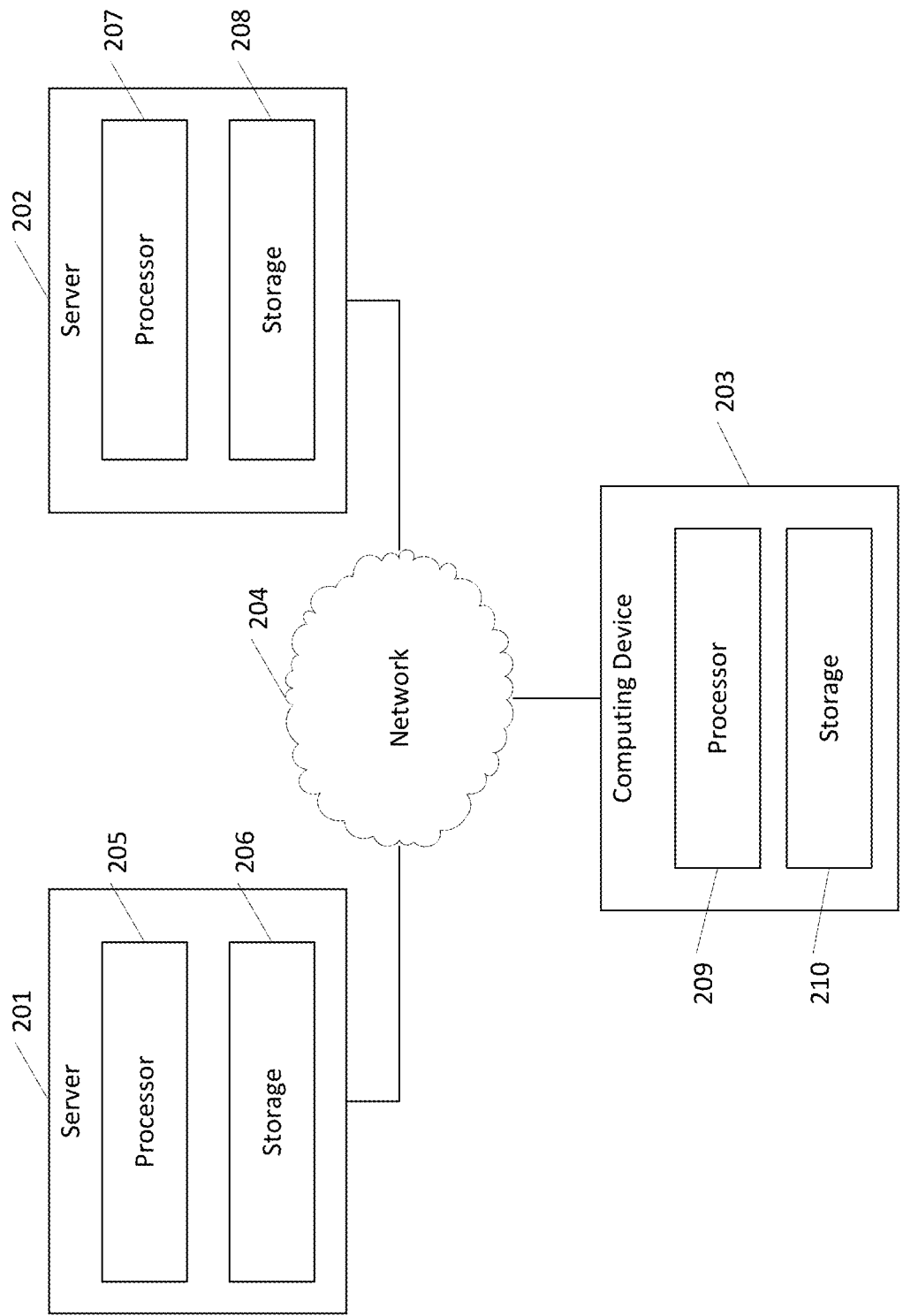
FIG. 2 depicts a block diagram of an environment in which systems and/or methods described herein may be implemented.

FIG. 2 is a block diagram of an environment in which systems and/or methods described herein may be implemented. As shown in FIG. 2, the environment may include servers 201 and 202 and a computing device 203 connected to a network 204. The devices, servers, and network may be interconnected via wired connections, wireless connections, or a combination of wired and wireless connections. The server 201 may be directed toward receiving files relating to activities from computing device 203 and then sending the files to server 202 for processing.

The network 204 may include one or more wired and/or wireless networks. For example, network 204 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more servers shown in FIG. 2 may be implemented within a single server, or a single server shown in FIG. 2 may be implemented as multiple, distributed servers or in a cloud-based computing environment. Additionally, or alternatively, a set of devices (e.g., one or more computing devices 203) of the environment may perform one or more functions described as being performed by another set of devices of the environment. Network 204 may be represented as a single network but may comprise combinations of other networks or subnetworks. In one or more examples, instances of data objects may be created by a server 201 and stored in storage 206. Those instances may be reviewed in server 201 and/or reviewed in server 202 to determine whether any portions of those instances overlap with previously generated instances. For overlapping portions of new instances, those overlapping portions may be removed and the modified instances sent to a computing device 203 of a custodian of the documents. The custodian of the documents may update the modified instances to include documents and/or document locations associated with requests of the modified instances. The completed modified instances may be returned to one or more of servers 201 and 202. The completed modified instances may then be processed to add back in the removed overlapping portions along with documents and/or document locations related to those overlapping portions. The resulting instances may then be forwarded with the documents and/or the document locations for further processing (e.g., storing the documents and/or obtaining and storing documents from the identified document locations).

To assist with explanation of the concepts described here, the disclosure includes the following sections: reducing overlapping portions of instances of data objects; workflow management of reducing overlapping portions of instances; and user interfaces.

Reducing Overlapping Portions of Instances of Data Objects

Figure 3:
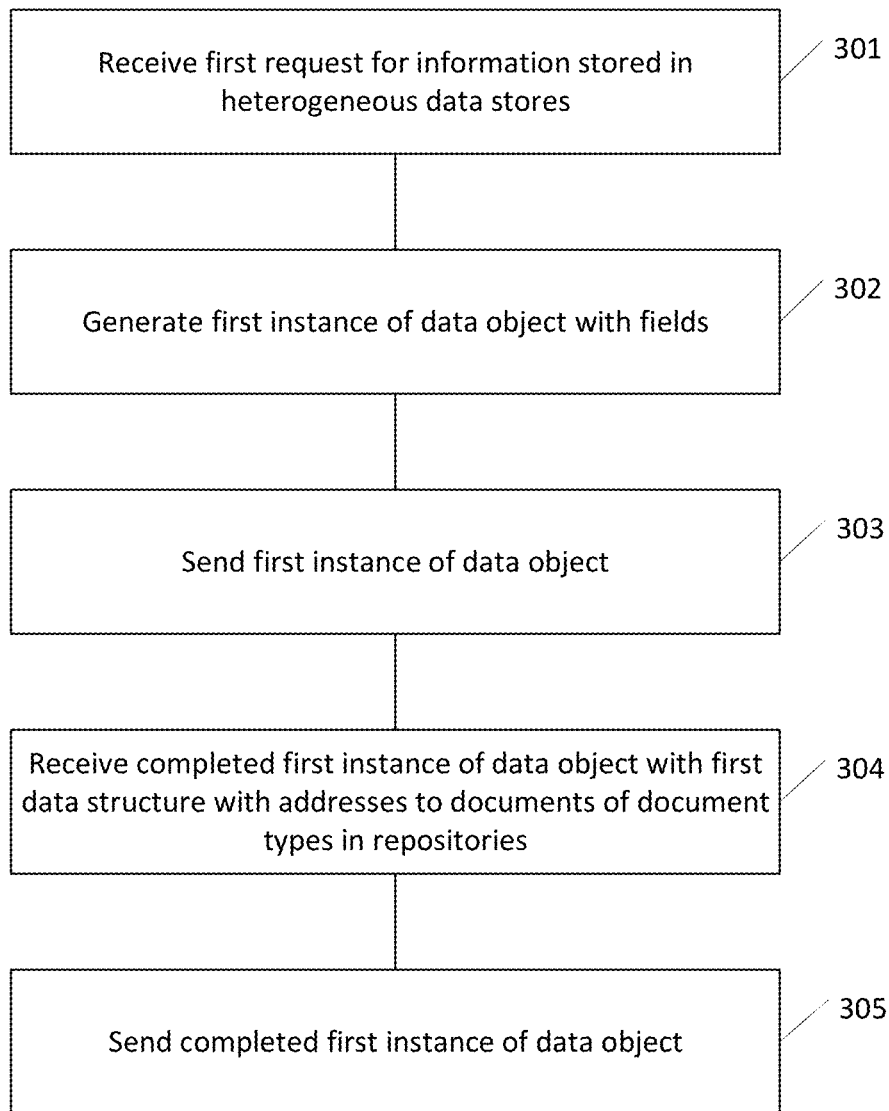
FIG. 3 depicts a flowchart describing a process relating to a first instance of a data object.

FIG. 3 depicts a flowchart describing a process relating to a first instance of a data object. In step 301, a first request is received for information stored in heterogeneous data stores.

The first request may be received from a first device and received by a second device. The first request may identify a first owner of one or more documents. The first request may also include a first time span and one or more first repository types. In step 302, a first instance of a data object may be generated where the first instance may include a device identification field identifying a third device associated with the first owner identification, a time span field including a first time span of a plurality of time spans, and first document type fields associated with one or more first repository types. In step 303, the first instance of the data object may be sent to the third device. The first owner may complete the first instance. In step 304, the system receives, from the third device, a completed first instance of the data object comprising a first data structure comprising a first address to a first document of a first document type in a first repository and a second address to a second document of a second document type in a second repository. In step 305, the completed first instance of the data object may be sent to storage and/or another system for further processing.

Figure 4:
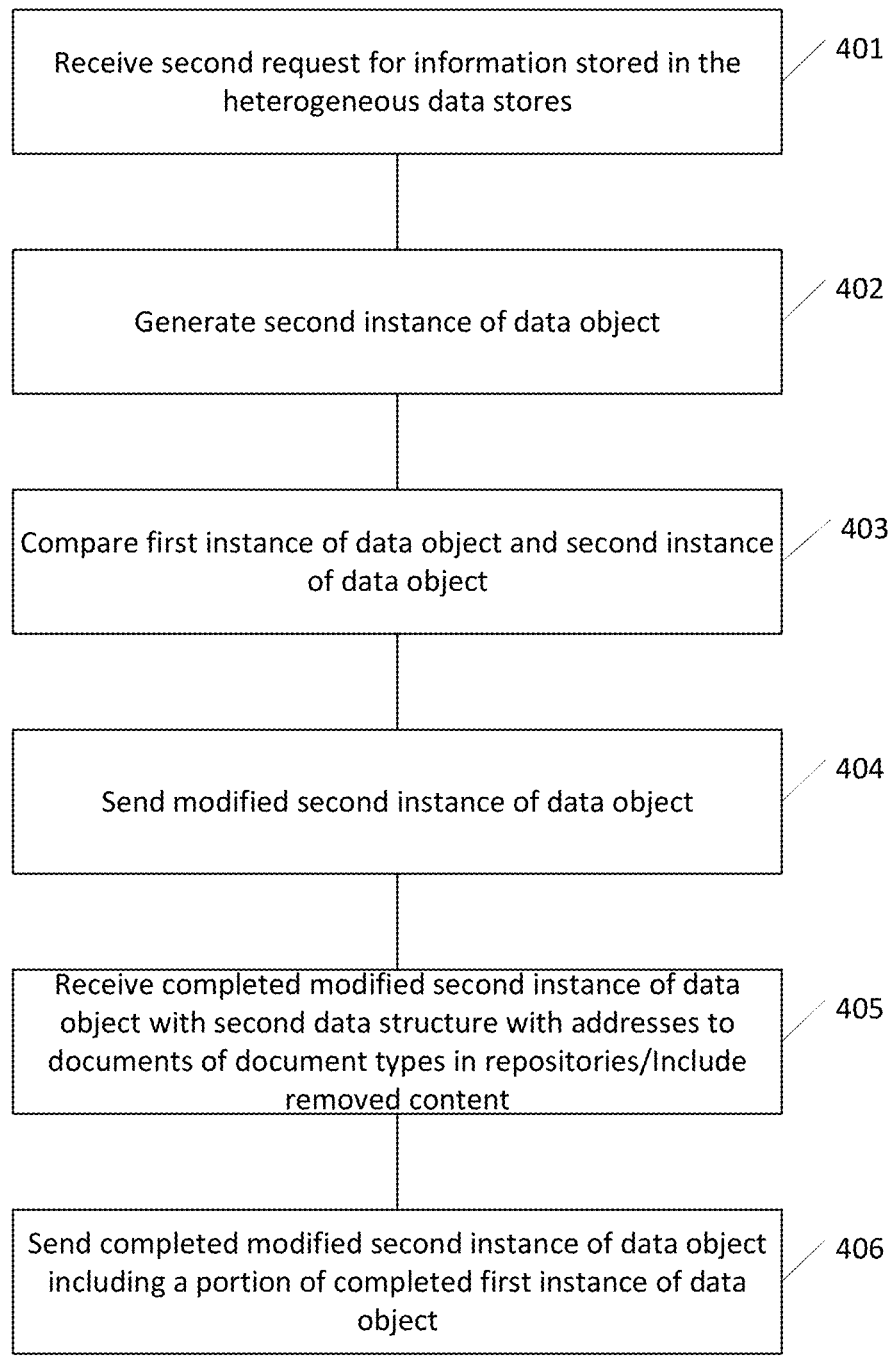
FIGS. 4-5 depict flowcharts describing processes relating to a second instance of the data object.

FIG. 4 depicts a flowchart describing processes relating to a second instance of the data object. In step 401, the system receives, from the first device and by the second device, a second request for information stored in the heterogeneous data stores. The second request may include the first owner identification, a second time span, and one or more second repository types. In step 402, the system generates a second instance of the data object including the device identification field identifying the third device, the time span field including the second time span, and second document type fields associated with the one or more second repository types. In step 403, the system compares the first instance of the data object and the second instance of the data object to determine whether any of the time span and/or repository types overlap. The second instance may be modified to remove the overlapping portions. In step 404, the system sends a modified second instance of the data object with one or more of a modified second time span or modified second document type fields associated with the one or more second repository types. The custodian completes the modified second instance by identifying documents and/or document locations corresponding to the requests of the modified second instance and sends the completed modified second instance to the system. In step 405, the system receives, from the custodian's device, a completed modified second instance of the data object including a second data structure including a third address to a third document of a third document type in a third repository, and a fourth address to a fourth document of a fourth document type in a fourth repository. The completed modified second instance is further modified to include previously removed portions and documents and/or document locations corresponding to the removed portions. In step 406, a second instance is sent with the previously removed portions and documents and/or document locations from the first instance corresponding to the previously removed portions. In one or more examples, the portion of the completed first instance of the data object satisfies at least a portion of the second request. In one or more examples, the first document type corresponds to the third document type.

Figure 5:
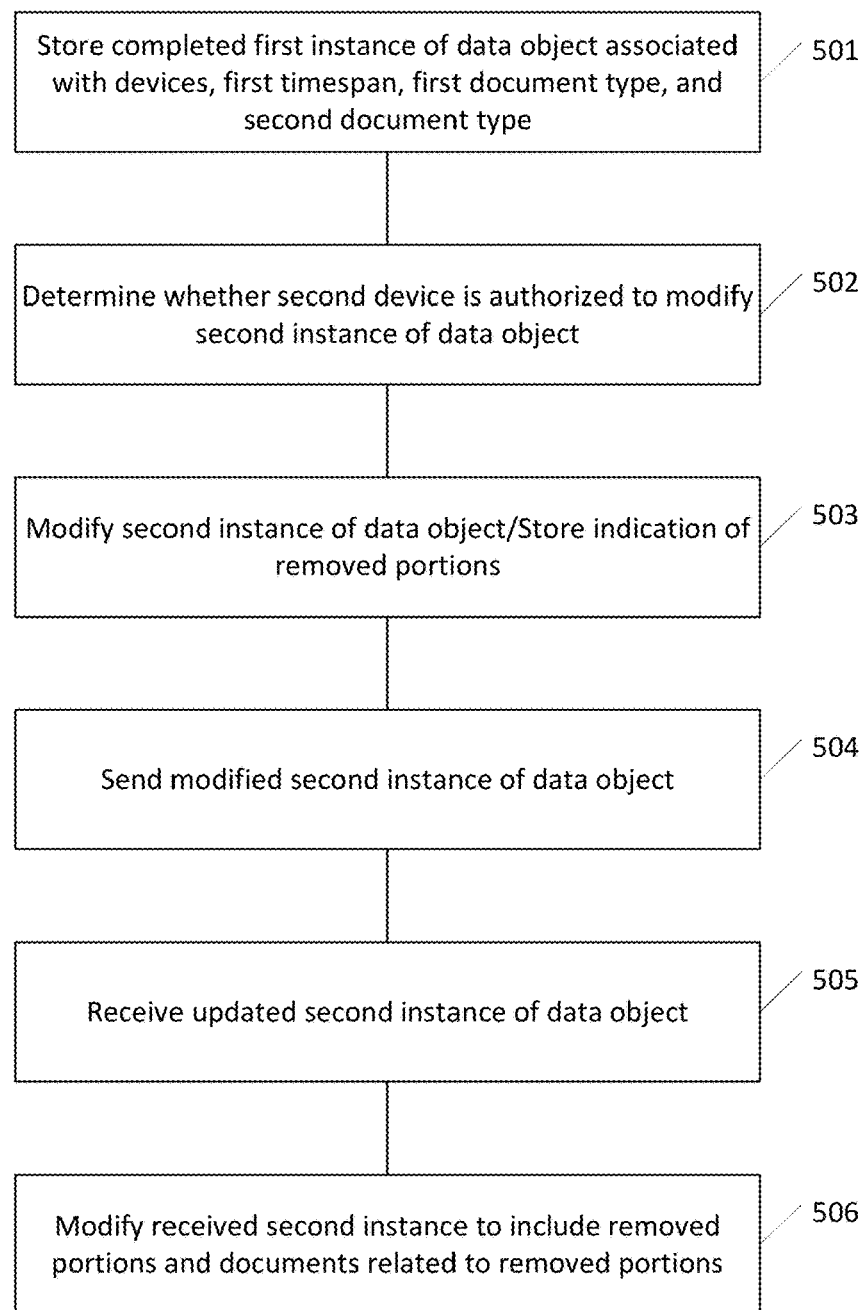

FIG. 5 depicts a flowchart describing additional processes relating to the second instance of the data object. In step 501, the system may store, in a workspace, the completed first instance of the data object associated with each of the second device, the third device, the first time span, the first document type, and the second document type. In step 502, the system may determine whether the second device is authorized to modify the second instance of the data object of step 403. In step 503, the system may modify, based on a determination that the second device is authorized to modify the second instance of the data object, the second instance of the data object. The system may further store an identification of which portions of the second instance were removed. In step 504, the system may send, to the third device, the modified second instance of the data object as modified by the second device. In step 505, the system may receive, from the third device, an updated second instance of the data object. In step 506, the system may modify the second instance to include, from the storage, the previously removed portions from step 503 and documents corresponding to those removed portions as having been previously identified with the first completed instance of the data object.

In one or more examples, first owner identification may comprise a single account. In other examples, the first owner identification may comprise a collection of accounts.

Figure 6:
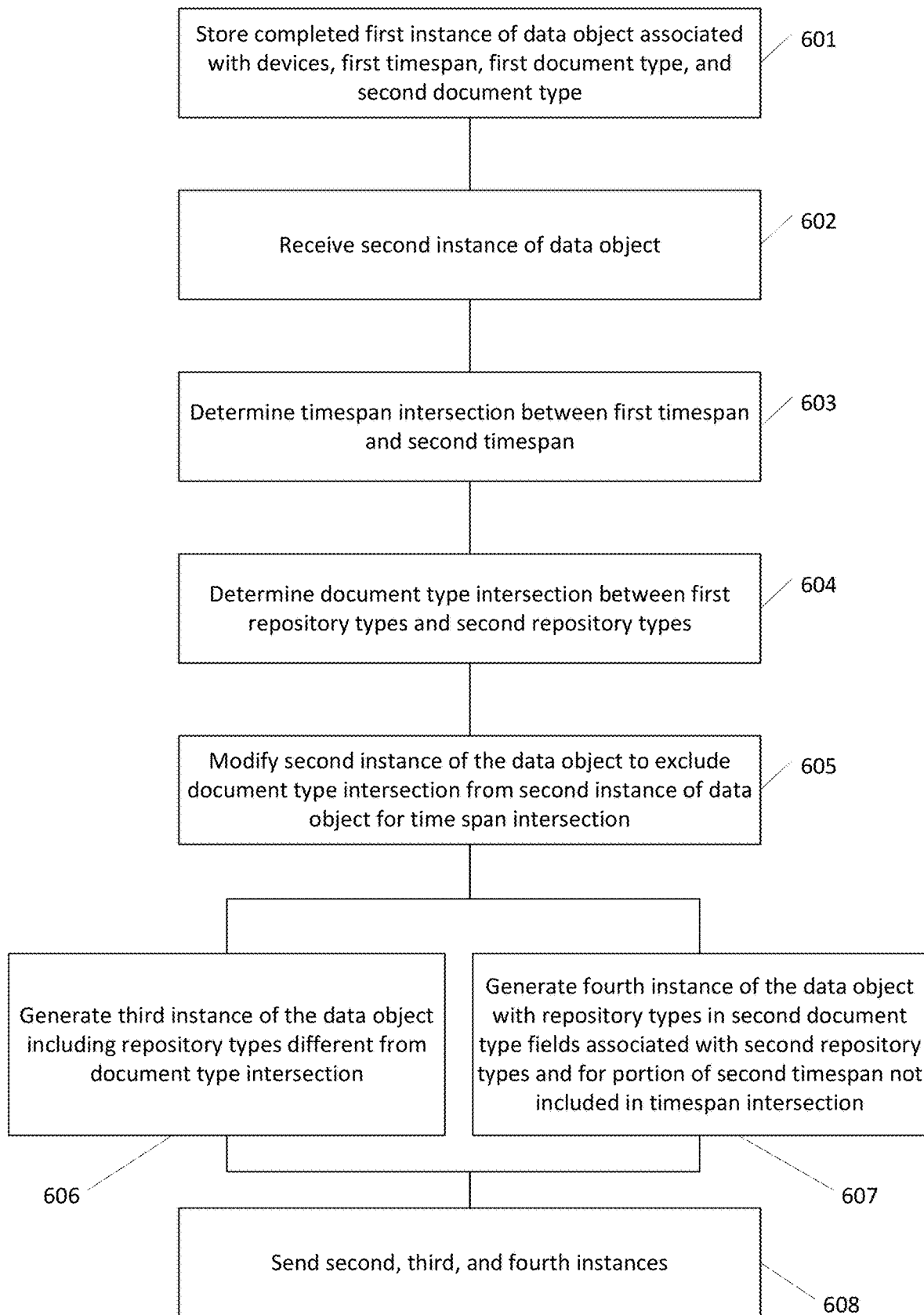
FIG. 6 depicts a flowchart describing a process for comparing the first and second instances of the data object.

In some instances, merely modifying the second instance to remove an overlapping time span may not provide enough specificity to cover the scope of the original second request. FIG. 6 relates to generating an additional instance or instances to cover the full scope of the second request. FIG. 6 depicts a flowchart describing a process for comparing the first and second instances of the data object. In step 601, a completed first instance of a data object is stored. The completed first instance includes a first time span, a first document type, and a second document type. In step 602, a second instance of the data object is received. In step 603, the system determines an intersection between the first time span and the second time span. In step 604, the system determines an intersection between the first repository types and the second repository types. In step 605, the system modifies, based on the time span intersection and the document type intersection, the second instance of the data object to exclude the document type intersection from the second instance of the data object for the time span intersection. In step 606, the system generates a third instance of the data object to include any repository types of the original second request not covered by the modified second request and also not covered by the documents from the received first request. In step 607, the system generates a fourth instance of the data object with repository types in second document type fields associated with second repository types and for portion of the second timespan not included in timespan intersection. In step 608, the second, third, and fourth instances are sent for completion by the custodian.

Workflow Management of Reducing Overlapping Portions of Instances

Figure 7:
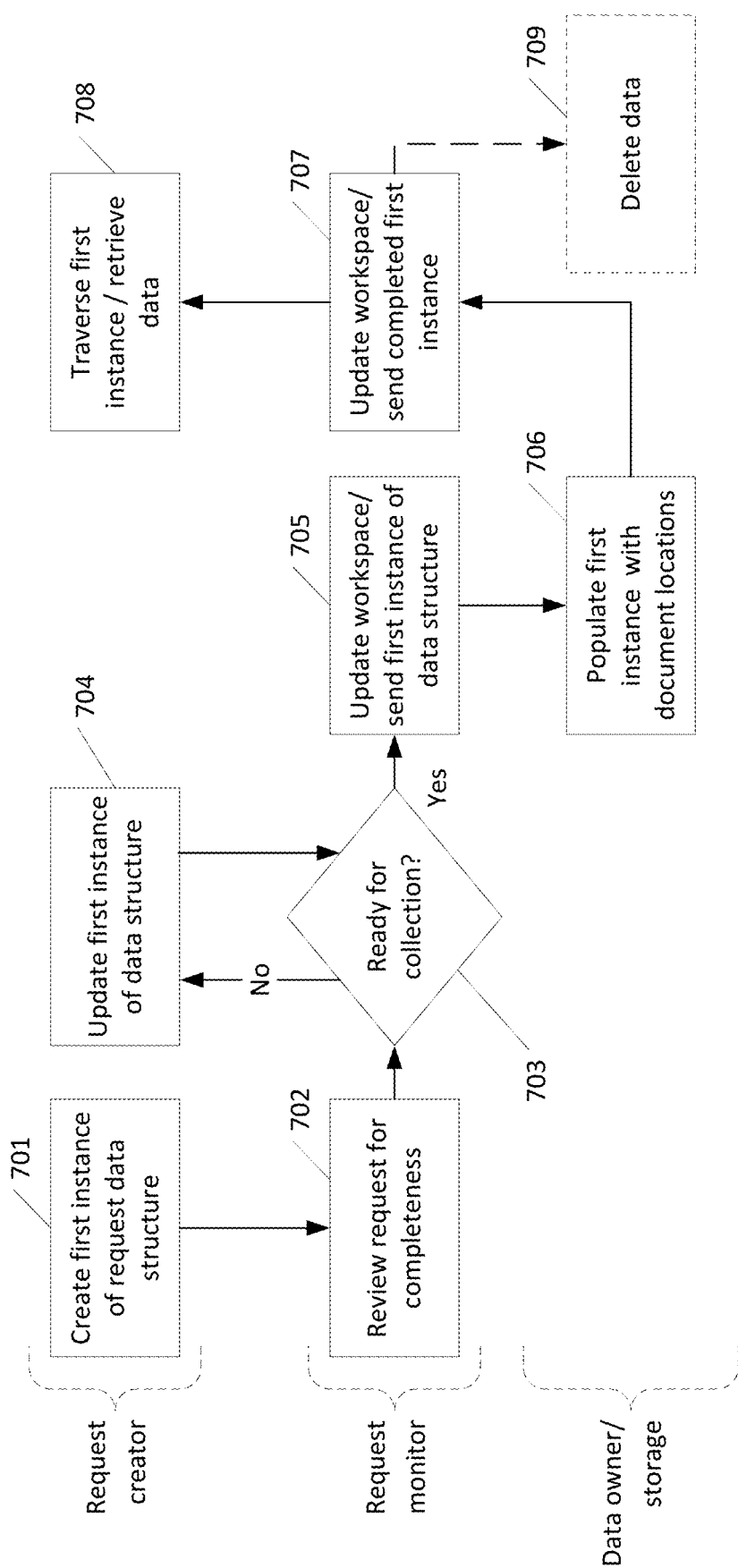
FIG. 7 depicts a flowchart describing handling of the first instance of the data object.

FIG. 7 depicts a flowchart describing handling of the first instance of the data object. FIG. 7 identifies various steps performed by a request creator, a request monitor, and a data owner/storage. In step 701, a first instance of a request data structure is created by a request creator. In step 702, a request monitor receives the request and reviews it for completeness. The request monitor determines, in step 703, whether the request is ready for collection. If not, the first instance is returned to the request creator, in step 704, to update the first instance of the data structure to comport with any missing items and return to the request monitor. Once the request is ready for completion from step 703, the request monitor, in step 705, updates the workspace and sends the first instance of the data structure to be completed. In step 706, the custodian of the documents (e.g., the data owner and/or storage location) populates the first instance with the documents and/or document locations corresponding to the first instance of the data structure. The completed first instance is returned to the request monitor. In step 707, the request monitor updates the workspace and sends the completed first instance to the request creator and/or another entity for further processing. For example, in step 708, the request creator may traverse the first instance and retrieve any documents identified with the document locations present in the first instance. In one or more examples, the data may be deleted in step 709 from storage after the data has been retrieved in step 708.

Figure 8:
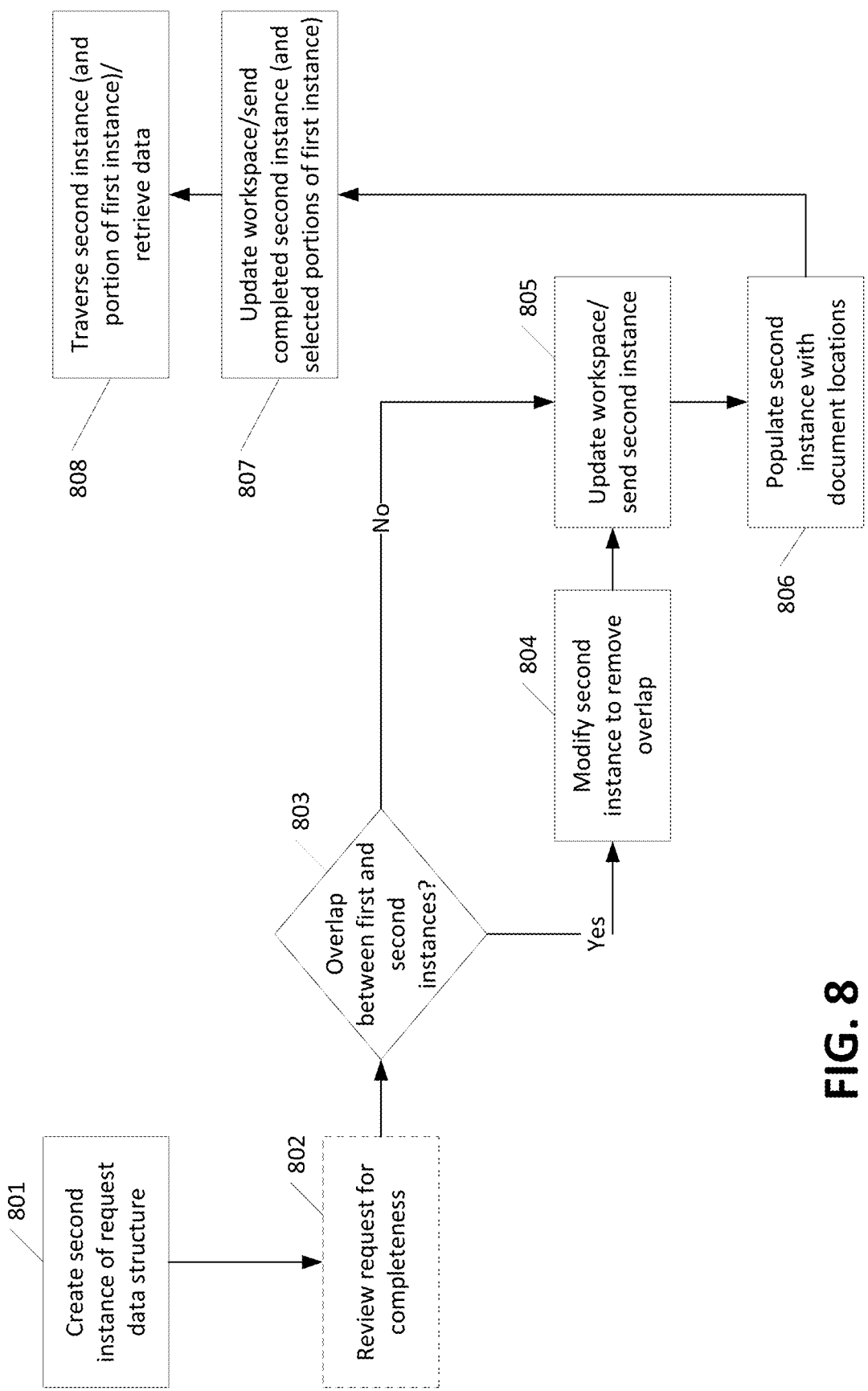
FIG. 8 depicts a flowchart describing handling of the second instance of the data object with respect to the first instance of the data object.

FIG. 8 depicts a flowchart describing handling of the second instance of the data object with respect to the first instance of the data object. In step 801, a second instance of a request data structure is generated. In step 802, optionally, the request and/or the second instance may be reviewed for completeness. In step 803, the system determines whether an overlap exists between portions of the first and second instances. If one or more overlapping portions exist, in step 804, the second instance is modified to remove the overlapping portions. The modified second instance is sent to step 805 where the workspaces are updated and the second instance is sent to the custodian of the documents. If there is no overlap between the first and second instances from step 803, the second instance may be sent to step 805. In step 806, the custodian populates the second instance with documents and/or document locations and returns the completed second instance. In step 807, the workspace is updated to identify the status of the second instance. The second instance may be further modified to include the portions removed in step 804 with the replaced portions including corresponding documents and/or document locations from one or more previous instances. In step 808, the second instance is traversed to retrieve any documents associated with the document locations. It is appreciated that in steps 807 and 808, the second instance may be modified to reinsert the removed portions from step 804. Additionally or alternatively, the removed portions of the second instance may be sent and traversed separately in steps 807-808 from the completed second instance from step 806.

Figure 9:
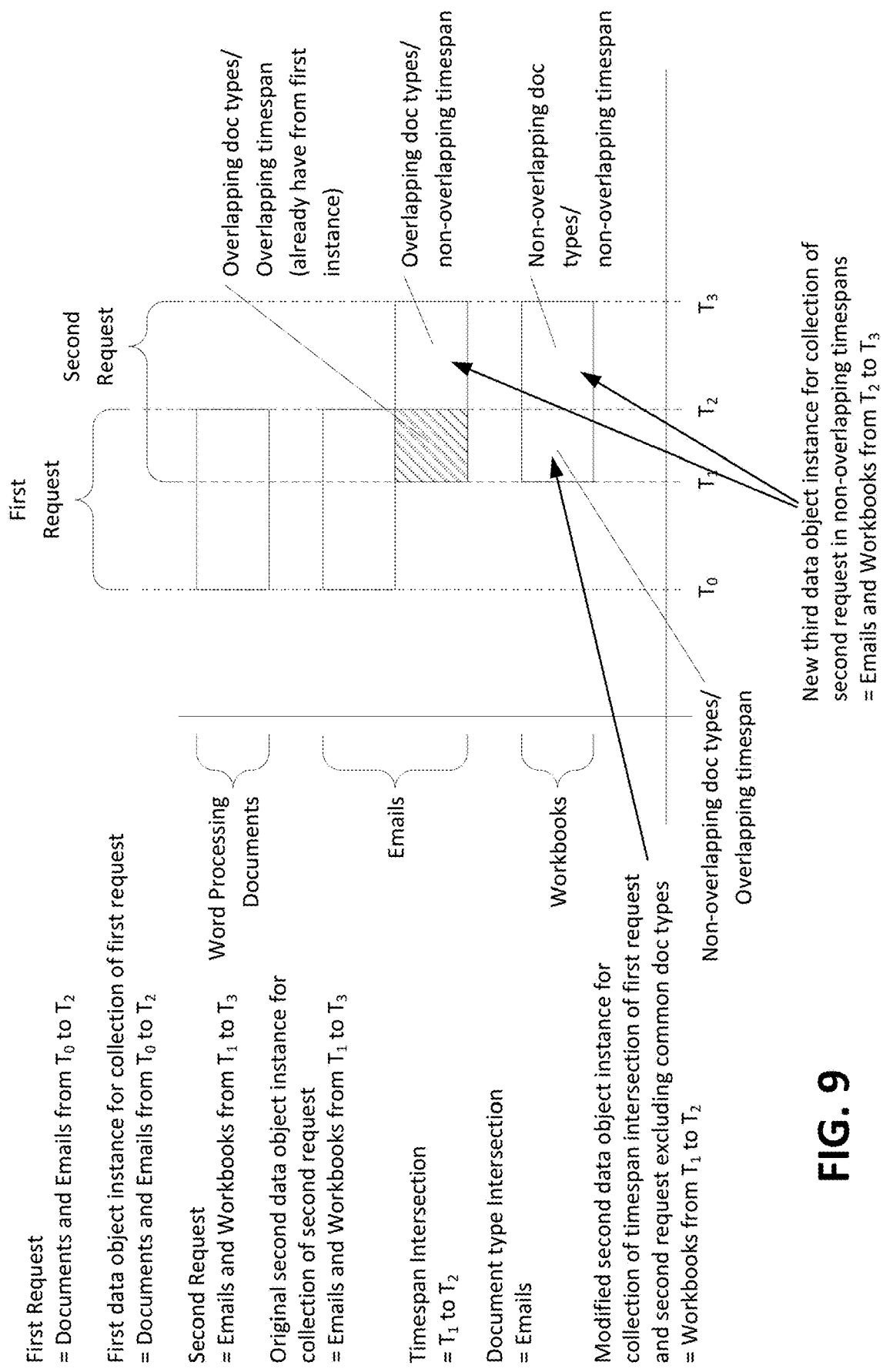
FIG. 9 depicts an example of overlapping and non-overlapping requests.

FIG. 9 depicts an example of overlapping and non-overlapping requests. A first request identifies word processing documents and emails to be retrieved that were created and/or modified during an identified time span. In this example, the time span is from date/time $T_0$ to date/time $T_2$. A first data object instance for collection of a first request may comprise a data object identifying that all word processing documents and emails are to be retrieved for that time span. The first instance may be sent for completion and subsequently returned and stored.

A second request may comprise emails and workbooks for a different time span, e.g., from date/time $T_1$ to date/time $T_3$. A second data object instance for collection of first request may comprise a data object identifying that all emails and workbooks are to be retrieved for that second time span.

The system may determine that emails are common to both the first instance and the second instance. However, the emails only overlap from date/time $T_1$ to date/time $T_2$. The system may modify the second instance to limit the time span to range from date/time $T_1$ to date/time $T_2$ and only relate to the collection of workbooks. Next, a new third instance of the data object may be created to collect emails and workbooks solely from date/time $T_2$ to date/time $T_3$.

As shown in FIG. 9, the instances are first controlled to identify time spans and then documents corresponding to those time spans. Alternatively, the instances may be first controlled to identify documents and then time spans associated with those documents. In this alternative approach to FIG. 9, the second modified instance may comprise a request only for emails during time span from date/time $T_2$ to date/time $T_3$ and the third instance may comprise only workbooks during time span from date/time $T_1$ to date/time $T_3$. Each of these approaches may be used interchangeably as desired and as relevant to how an ultimate data storage system is configured. For instance, if the data storage system is more efficient at storing large datasets comprising multiple time spans, prioritizing the document type over time span may be desired. However, if the data storage system preferences time spans over data types, the requests may be modified to prioritize time spans over document types.

Figure 10:
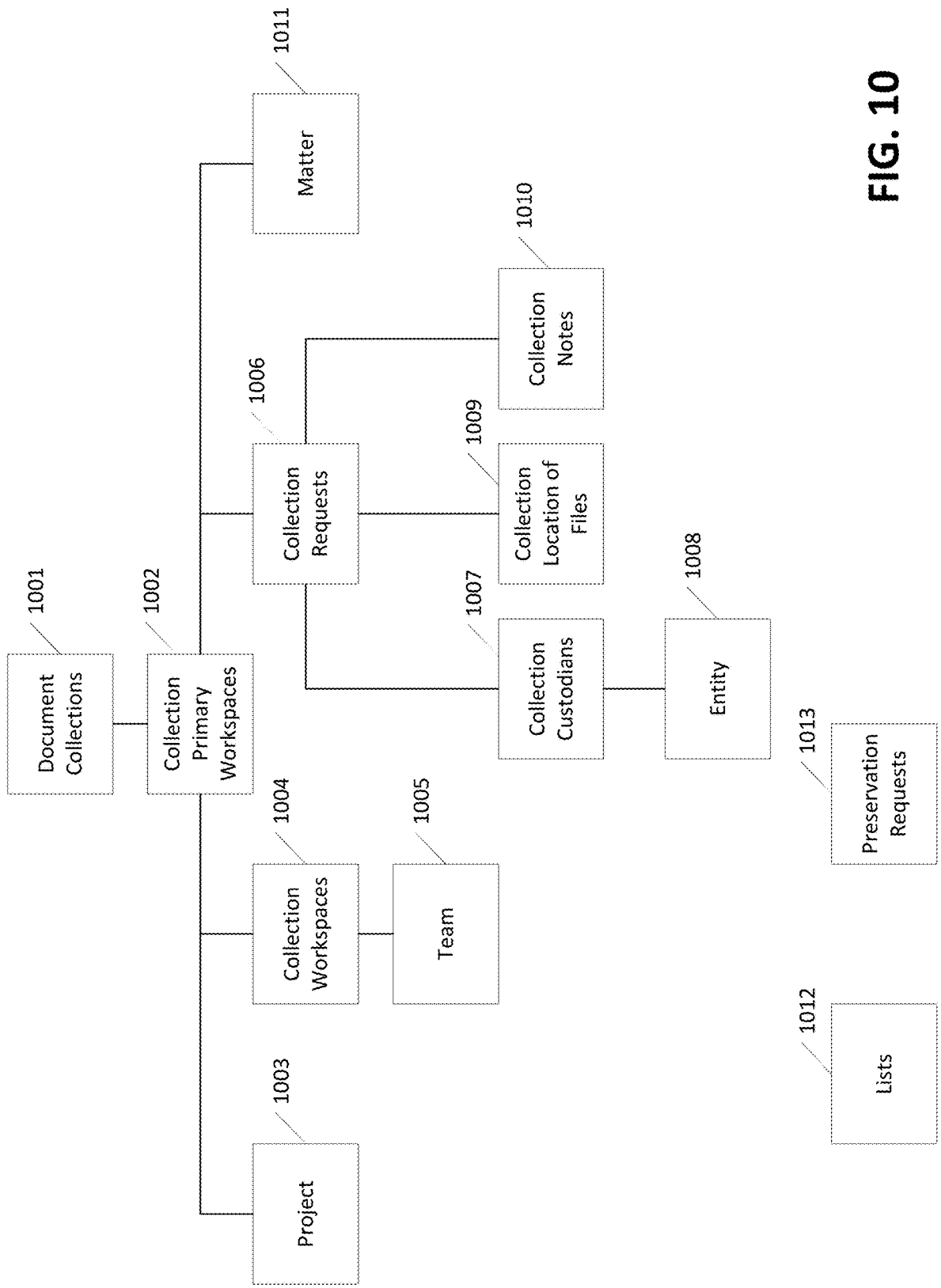
FIG. 10 depicts an example organizational structure for relationships between entities handling data objects.

FIG. 10 shows an example relationship data structure that further identifies relationships between the request creator, the request monitor, and the data owner/custodian of FIG. 7. The relationship data structure of FIG. 10 may be used to organize and/or control the user interfaces of FIGS. 11-14. A document collections system 1001 may comprise a number of primary workspaces 1002 (one of which is shown in FIG. 10). Each collection primary workspace may include a project 1003, individual collection workspaces 1004 with one or more teams 1005 for each collection workspace 1004. Collection requests 1006 may include collection custodians 1007 (where each collection custodian 1008 may be individually identified), a collection of file locations 1009, and, if desired, any collection notes 1010. Individual matters 1011 may further be identified. Lists of workspaces 1012 may also be included to further organize the primary workspaces. Preservation requests 1013 may further be included that may identify how documents are to be retained and/or destroyed (as step 709 from FIG. 7).

User Interfaces

Figure 11:
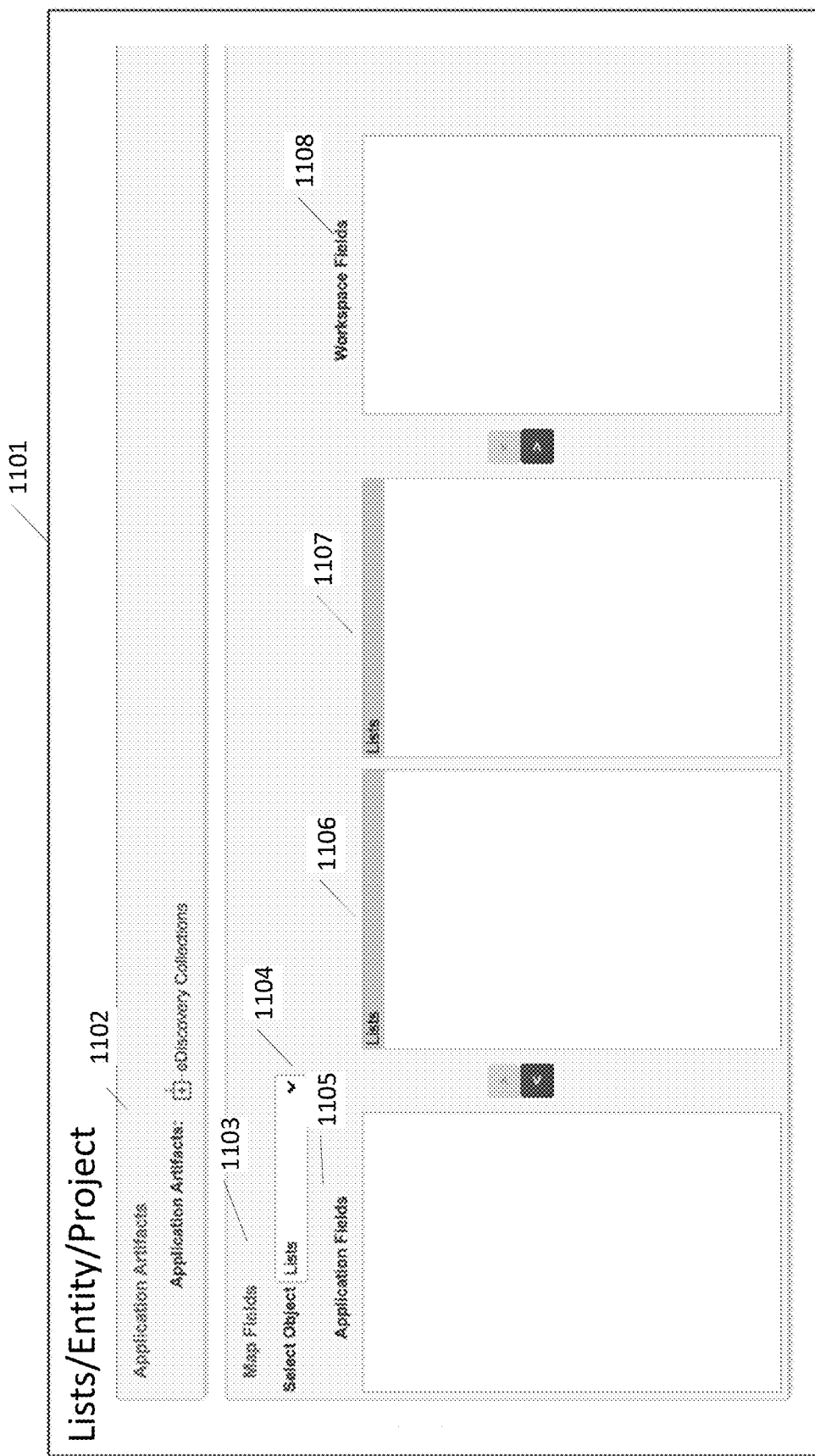
FIGS. 11-14 depict various user interfaces for specifying which documents are to be obtained and the tracking of requests for the documents.

FIGS. 11-14 depict various user interfaces for specifying which documents are to be obtained and the tracking of requests for the documents. FIG. 11 provides a user interface 1101 for mapping fields of data. For a given application identified in region 1102, a user may be permitted to map fields in region 1103 between lists, entities, and projects, selectable via a drop down menu in region 1104. For the example of mapping fields between lists, a user selects the list in region 1104 and lists of fields available to be mapped to applications and/or workspaces are shown in regions 1106 and 1107. For instance, a user may control region 1106 to identify fields to be added to the application fields 1105 and control region 1107 to identify fields to be added to the workspace fields 1108. By controlling region 1104, the user may select between entities and projects as well.

Figure 12:
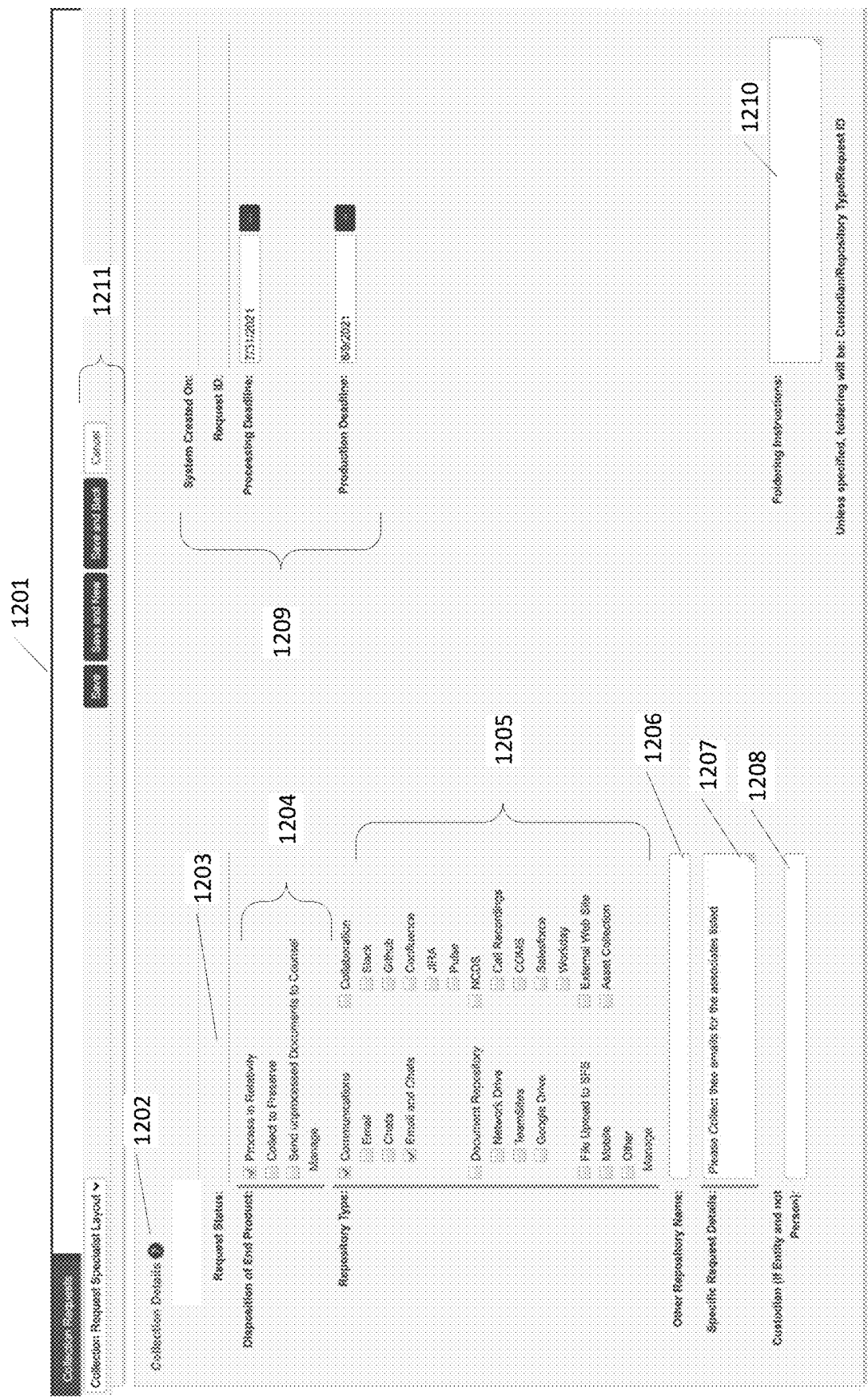

In FIG. 12, a user interface 1201 for creating a collection request object is shown. A user may be provided various information in a collection details region 1202. The status of the collection request object may be provided in region 1203. This region may be useful when modifying an existing collection request instance. The user interface may permit a user to identify, in region 1204, various end dispositions of the result of the collected information. The repositories of data types to be obtained may be specified in region 1205. Other repositories may be further identified in region 1206. Specific request details may be provided in region 1207. A custodian of the documents may be identified in region 1208. Additional request details (including when the system was created, a request ID, a processing deadline, and a production deadline) may be identified in region 1209. Finally, additional folder instructions may be provided in region 1210. Regions 1211 may be associated with various save-related options including a save operation, a save and a create a new collection request operation, a save and return to a general collection page operation, and a cancel operation.

Figure 13:
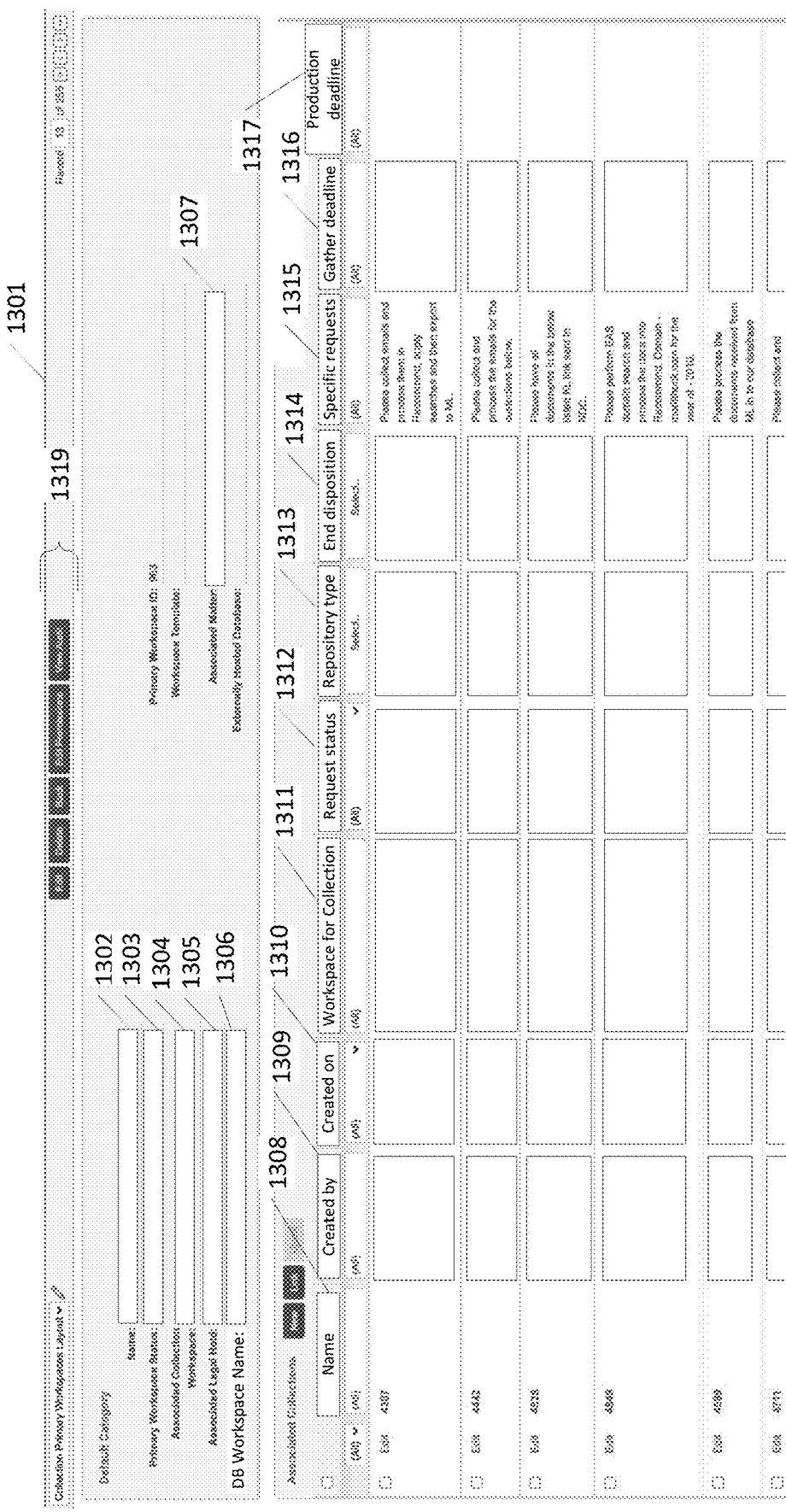

In FIG. 13, a user interface 1301 for monitoring the status of document requests is provided. The user interface 1301 may include a name of the workspace 1302, a primary workspace status 1303, and associated collection workspace 1304, and associated legal hold 1305, a database specific workspace name 1306, and an associated matter 1307. The statuses of the requests may be provided and filtered via one or more of the following sections: a name region 1308, a created by region 1309, a created on region 1310, a workspace for collection identification region 1311, a request status region 1312, a list of repository types region 1313, and disposition region 1314, specific requests region 1315, a gathering deadline region 1316, and a production deadline region 1317. Regions 1319 may be associated with various save-related options including a save operation, a save and a create a new collection request operation, a save and return to a general collection page operation, and a cancel operation.

Figure 14:

In FIG. 14, a user interface for entering and editing a workspace identification is provided. The user interface may permit entry and editing of one or more of the following: a matter name in region 1401, a matter ID in region 1402, a creation date in region 1403, a current phase in region 1404, an issue type in region 1405, a main assignee in region 1406, a specialist for handling a particular collection in region 1407, a date resolved in region 1408, organizational unit in region 1409, and a practice group in region 1410.

Some implementations described herein relate to a computer-implemented method for receiving, from a first device and by a second device, a first request for information stored in heterogeneous data stores. The first request may include a first owner identification, a first time span, and one or more first repository types. The method may also include generating, based on the first request for information, a first instance of a data object comprising a device identification field identifying a third device associated with the first owner identification, a time span field including a first time span of a plurality of time spans, and first document type fields associated with one or more first repository types; sending the first instance of the data object to the third device; receiving, from the third device, a completed first instance of the data object comprising a first data structure comprising a first address to a first document of a first document type in a first repository and a second address to a second document of a second document type in a second repository; and sending, in response to the first request, the completed first instance of the data object.

The method may further include receiving, from the first device and by the second device, a second request for information stored in the heterogeneous data stores, wherein the second request may include the first owner identification, a second time span, and one or more second repository types, and generating, based on the second request for information, a second instance of the data object comprising the device identification field identifying the third device, the time span field including the second time span, and second document type fields associated with the one or more second repository types. The method may include comparing the first instance of the data object and the second instance of the data object; sending, to the third device and based on the comparison, a modified second instance of the data object with one or more of a modified second time span or modified second document type fields associated with the one or more second repository types; receiving, from the third device, a completed modified second instance of the data object comprising a second data structure including a third address to a third document of a third document type in a third repository, and a fourth address to a fourth document of a fourth document type in a fourth repository; and sending, in response to the second request, the completed modified second instance of the data object and, based on the comparison, a portion of the completed first instance of the data object. The portion of the completed first instance of the data object may satisfy at least a portion of the second request. In some aspects, the first document type may correspond to the third document type.

In some aspects, the computer-implemented method may further include storing, in a workspace, the completed first instance of the data object associated with each of the second device, the third device, the first time span, the first document type, and the second document type; determining whether the second device is authorized to modify the second instance of the data object; modifying, based on a determination that the second device is authorized to modify the second instance of the data object, the second instance of the data object; and sending, to the third device, the modified second instance of the data object.

In some aspects, the computer-implemented method may further include determining a time span intersection between the first time span and the second time span; determining a document type intersection between the one or more first repository types and the one or more second repository types; and modifying, based on the time span intersection and the document type intersection, the second instance of the data object to exclude the document type intersection from the second instance of the data object for the time span intersection.

In some aspects, the computer-implemented method may further include generating a third instance of the data object including repository types different from the document type intersection, wherein the third instance includes, in the time span field, the time span intersection; and generating a fourth instance of the data object including the repository types in the second document type fields associated with the one or more second repository types and for a portion of the second time span not included in the time span intersection.

Some implementations described herein relate to an apparatus comprising one or more processors and memory storing instructions that when executed by the one or more processors cause the apparatus to receive, from a first device and by a second device, a first request for information stored in heterogeneous data stores, wherein the first request may include a first owner identification, a first time span, and one or more first repository types; generate, based on the first request for information, a first instance of a data object comprising a device identification field identifying a third device associated with the first owner identification, a time span field including a first time span of a plurality of time spans, and first document type fields associated with one or more first repository types; and send the first instance of the data object to the third device. The instructions may also control the apparatus to receive, from the third device, a completed first instance of the data object comprising a first data structure comprising a first address to a first document of a first document type in a first repository and a second address to a second document of a second document type in a second repository; send, in response to the first request, the completed first instance of the data object; receive, from the first device and by the second device, a second request for information stored in the heterogeneous data stores, wherein the second request may include the first owner identification, a second time span, and one or more second repository types; and generate, based on the second request for information, a second instance of the data object comprising the device identification field identifying the third device, the time span field including the second time span, and second document type fields associated with the one or more second repository types. The instructions may further cause the apparatus to compare the first instance of the data object and the second instance of the data object; send, to the third device and based on the comparison, a modified second instance of the data object with one or more of a modified second time span or second document type fields associated with the one or more second repository types; receive, from the third device, a completed modified second instance of the data object comprising a second data structure including a third address to a third document of a third document type in a third repository, and a fourth address to a fourth document of a fourth document type in a fourth repository; and send, in response to the second request, the completed modified second instance of the data object and, based on the comparison, a portion of the completed first instance of the data object. The portion of the completed first instance of the data object may satisfy at least a portion of the second request. In some examples, the first document type may correspond to the third document type.

In some examples, the instructions may further cause the apparatus to store, in a workspace, the completed first instance of the data object associated with each of the second device, the third device, the first time span, the first document type, and the second document type; determine whether the second device is authorized to modify the first instance of the data object; modify, based on a determination that the second device is authorized to modify the second instance of the data object, the first instance of the data object; send, to the third device, the modified second instance of the data object.

The instructions may further cause the apparatus to determine a time span intersection between the first time span and the second time span; determine a document type intersection between the one or more first repository types and the one or more second repository types; and modify, based on the time span intersection and the document type intersection, the second instance of the data object to exclude the document type intersection from the second instance of the data object for the time span intersection.

The instructions may further cause the apparatus to generate a third instance of the data object including repository types different from the document type intersection, wherein the third instance includes, in the time span field, the time span intersection; and generate a fourth instance of the data object including the repository types in the second document type fields associated with the one or more second repository types and for a portion of the second time span not included in the time span intersection.

One more non-transitory media may store instructions that, when executed by one or more processors, cause the one or more processors to perform steps comprising receiving, from a first device and by a second device, a first request for information stored in heterogeneous data stores, wherein the first request may include a first owner identification, a first time span, and one or more first repository types; generating, based on the first request for information, a first instance of a data object comprising a device identification field identifying a third device associated with the first owner identification, a time span field including a first time span of a plurality of time spans, and first document type fields associated with one or more first repository types; sending the first instance of the data object to the third device; receiving, from the third device, a completed first instance of the data object comprising a first data structure comprising a first address to a first document of a first document type in a first repository and a second address to a second document of a second document type in a second repository; sending, in response to the first request, the completed first instance of the data object; receiving, from the first device and by the second device, a second request for information stored in the heterogeneous data stores, wherein the second request may include the first owner identification, a second time span, and one or more second repository types; generating, based on the second request for information, a second instance of the data object comprising the device identification field identifying the third device, the time span field including the second time span, and second document type fields associated with the one or more second repository types; comparing the first instance of the data object and the second instance of the data object; sending, to the third device and based on the comparison, a modified second instance of the data object with one or more of a modified second time span or second document type fields associated with the one or more second repository types; receiving, from the third device, a completed modified second instance of the data object comprising a second data structure including a third address to a third document of a third document type in a third repository, and a fourth address to a fourth document of a fourth document type in a fourth repository; and sending, in response to the second request, the completed modified second instance of the data object and, based on the comparison, a portion of the completed first instance of the data object. The portion of the completed first instance of the data object may satisfy at least a portion of the second request. The first document type may correspond to the third document type.

The instructions may further include storing, in a workspace, the completed first instance of the data object associated with each of the second device, the third device, the first time span, the first document type, and the second document type; determining whether the second device is authorized to modify the second instance of the data object; modifying, based on a determination that the second device is authorized to modify the second instance of the data object, the second instance of the data object; and sending, to the third device, the modified second instance of the data object.

The instructions may further include determining a time span intersection between the first time span and the second time span; determining a document type intersection between the one or more first repository types and the one or more second repository types; and modifying, based on the time span intersection and the document type intersection, the second instance of the data object to exclude the document type intersection from the second instance of the data object for the time span intersection.

Other embodiments of this aspect include corresponding computer systems, apparatus, and computer programs recorded on one or more computer storage devices, each configured to perform the actions of the methods.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:
    receiving, from a first device and by a second device, a first request for information stored in data stores;

generating, based on the first request for information, a first instance of a data object comprising a device identification field identifying a third device, and first document type fields;
sending the first instance of the data object to the third device;
receiving, from the third device, a completed first instance of the data object comprising a first data structure comprising a first address to a first document of a first document type and a second address to a second document of a second document type;
storing, in a workspace, the completed first instance of the data object associated with each of the second device, the third device, the first document type, and the second document type;
sending, in response to the first request, the completed first instance of the data object;
receiving, from the first device and by the second device, a second request for information stored in the data stores;
generating, based on the second request for information, a second instance of the data object comprising the device identification field identifying the third device, and second document type fields;
determining whether the second device is authorized to modify the second instance of the data object;
comparing the first instance of the data object and the second instance of the data object;
modifying, based on a determination that the second device is authorized to modify the second instance of the data object, the second instance of the data object;
sending, to the third device and based on the comparing, the modified second instance of the data object with modified second document type fields;
receiving, from the third device, a completed modified second instance of the data object comprising a second data structure comprising a third address to a third document of a third document type, and a fourth address to a fourth document of a fourth document type; and
sending, in response to the second request, the completed modified second instance of the data object and, based on the comparing, a portion of the completed first instance of the data object,
wherein the portion of the completed first instance of the data object satisfies at least a portion of the second request.

2. The computer-implemented method of claim 1, wherein the first document type corresponds to the third document type.

3. The computer-implemented method of claim 1, wherein the first request further comprises a first owner identification identifying a single account.

4. The computer-implemented method of claim 1, wherein the first request further comprises a first owner identification identifying a collection of accounts.

5. The computer-implemented method of claim 1, wherein the first request comprises a first owner identification, a first time span, and one or more first repository types, and
wherein the second request comprises the first owner identification, a second time span, and one or more second repository types.

6. The computer-implemented method of claim 1, wherein the first request comprises a first time span, wherein the second request comprises a second time span, and wherein the comparing comprises:
determining a time span intersection between the first time span and the second time span; and
modifying, based on the time span intersection, the second instance of the data object to exclude the time span intersection.

7. The computer-implemented method of claim 6, wherein the modifying comprises:
generating a third instance of the data object including the time span intersection; and
generating a fourth instance of the data object for a portion of the second time span not included in the time span intersection.

8. An apparatus comprising:
one or more processors; and
memory storing instructions that, when executed by the one or more processors, cause the apparatus to:
receive, from a first device and by a second device, a first request for information stored in data stores;
generate, based on the first request for information, a first instance of a data object comprising a device identification field identifying a third device, and first document type fields;
send the first instance of the data object to the third device;
receive, from the third device, a completed first instance of the data object comprising a first data structure comprising a first address to a first document of a first document type and a second address to a second document of a second document type;
store, in a workspace, the completed first instance of the data object associated with each of the second device, the third device, the first document type, and the second document type;
send, in response to the first request, the completed first instance of the data object;
receive, from the first device and by the second device, a second request for information stored in the data stores;
generate, based on the second request for information, a second instance of the data object comprising the device identification field identifying the third device, and second document type fields;
determine whether the second device is authorized to modify the second instance of the data object;
compare the first instance of the data object and the second instance of the data object;
modify, based on a determination that the second device is authorized to modify the second instance of the data object, the second instance of the data object;
send, to the third device and based on the comparison, the modified second instance of the data object with modified second document type fields;
receive, from the third device, a completed modified second instance of the data object comprising a second data structure comprising a third address to a third document of a third document type, and a fourth address to a fourth document of a fourth document type; and
send, in response to the second request, the completed modified second instance of the data object and, based on the comparison, a portion of the completed first instance of the data object,
wherein the portion of the completed first instance of the data object satisfies at least a portion of the second request.

9. The apparatus of claim 8,
wherein the first document type corresponds to the third document type.

10. The apparatus of claim 8,
wherein the first request further comprises a first owner identification identifying a single account.

11. The apparatus of claim 8,
wherein the first request further comprises a first owner identification identifying a collection of accounts.

12. The apparatus of claim 8,
wherein the first request comprises a first owner identification, a first time span, and one or more first repository types, and
wherein the second request comprises the first owner identification, a second time span, and one or more second repository types.

13. The apparatus of claim 8,
wherein the first request comprises a first time span,
wherein the second request comprises a second time span, and
wherein the instructions to compare further cause the apparatus to:
  determine a time span intersection between the first time span and the second time span; and
  modify, based on the time span intersection, the second instance of the data object to exclude the time span intersection.

14. The apparatus of claim 13, wherein the instructions to modify further cause the apparatus to:
  generate a third instance of the data object including the time span intersection; and
  generate a fourth instance of the data object including a portion of the second time span not included in the time span intersection.

15. One or more non-transitory media storing instructions that, when executed by one or more processors, cause the one or more processors to perform steps comprising:
  receiving, from a first device and by a second device, a first request for information stored in data stores, wherein the first request comprises one or more first repository types;
  generating, based on the first request for information, a first instance of a data object comprising a device identification field identifying a third device and first document type fields;
  sending the first instance of the data object to the third device;
  receiving, from the third device, a completed first instance of the data object comprising a first data structure comprising a first address to a first document of a first document type and a second address to a second document of a second document type;
  storing, in a workspace, the completed first instance of the data object associated with each of the second device, the third device, the first document type, and the second document type;
  sending, in response to the first request, the completed first instance of the data object;
  receiving, from the first device and by the second device, a second request for information stored in the data stores;
  generating, based on the second request for information, a second instance of the data object comprising the device identification field identifying the third device, and second document type fields;
  determining whether the second device is authorized to modify the second instance of the data object;
  comparing the first instance of the data object and the second instance of the data object;
  modifying, based on a determination that the second device is authorized to modify the second instance of the data object, the second instance of the data object;
  sending, to the third device and based on the comparing, the modified second instance of the data object with modified second document type fields;
  receiving, from the third device, a completed modified second instance of the data object comprising a second data structure comprising a third address to a third document of a third document type, and a fourth address to a fourth document of a fourth document type; and
  sending, in response to the second request, the completed modified second instance of the data object and, based on the comparing, a portion of the completed first instance of the data object,
  wherein the portion of the completed first instance of the data object satisfies at least a portion of the second request.

16. The one or more non-transitory media of claim 15,
wherein the first document type corresponds to the third document type.

17. The one or more non-transitory media of claim 15, wherein the first request further comprises a first owner identification identifying a single account.

18. The one or more non-transitory media of claim 15, wherein the first request further comprises a first owner identification identifying a collection of accounts.

19. The one or more non-transitory media of claim 15,
wherein the first request comprises a first owner identification, a first time span, and one or more first repository types, and
wherein the second request comprises the first owner identification, a second time span, and one or more second repository types.

20. The one or more non-transitory media of claim 15,
wherein the first request comprises a first time span,
wherein the second request comprises a second time span, and
wherein the comparing comprises:
  determining a time span intersection between the first time span and the second time span; and
  modifying, based on the time span intersection, the second instance of the data object to exclude the time span intersection.

* * * * *